US010802575B2

United States Patent
Schlecht et al.

(10) Patent No.: US 10,802,575 B2
(45) Date of Patent: Oct. 13, 2020

(54) SMART EXTERNAL DISPLAY FOR VEHICLES

(71) Applicant: Karma Automotive, LLC, Costa Mesa, CA (US)

(72) Inventors: Fairuz Jane Schlecht, Newport Beach, CA (US); Nikola Kostov Stefanov, San Clemente, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 15/177,283

(22) Filed: Jun. 8, 2016

(65) Prior Publication Data

US 2016/0363991 A1    Dec. 15, 2016

Related U.S. Application Data

(60) Provisional application No. 62/174,445, filed on Jun. 11, 2015.

(51) Int. Cl.
*G06F 3/01* (2006.01)
*B60R 16/023* (2006.01)
(Continued)

(52) U.S. Cl.
CPC ............. *G06F 3/011* (2013.01); *B60K 35/00* (2013.01); *B60K 37/06* (2013.01); *B60R 16/023* (2013.01);
(Continued)

(58) Field of Classification Search
CPC .. B60K 35/00; B60K 37/06; B60K 2350/106; B60K 2350/1028; B60K 2350/1044; B60K 2350/1096; B60K 2350/352; B60K 2350/355; B60K 2350/924; B60R 16/023; G06F 3/011; G06F 3/0481; G06F 3/0484; G06F 3/04883; G06F 3/167; G06Q 30/0266; G09F 21/048; G09F 27/005; G09F 2027/001
See application file for complete search history.

(56) References Cited

U.S. PATENT DOCUMENTS 7,154,383 B2 * 12/2006 Berquist ................. G09F 21/04
340/425.5
9,349,234 B2 *  5/2016 Ricci ..................... H04W 48/04
(Continued)

FOREIGN PATENT DOCUMENTS

DE     102013006148 A1   10/2014

*Primary Examiner* — Rachid Bendidi
(74) *Attorney, Agent, or Firm* — Gordon Rees Scully Mansukhani, LLP

(57) ABSTRACT

There is provided a vehicle comprising a body having an exterior, an external display screen visible on the exterior of the body, a proximity sensor, a non-transitory memory storing an executable code and a vehicle information database including vehicle information, and a hardware processor executing the executable code to detect, using the proximity sensor, an individual within a proximity of the vehicle, activate the external display screen in response to detecting the individual within the proximity of the vehicle, display, on the external display screen, the vehicle information from the vehicle information database stored in the memory, in response to detecting the individual within the proximity of the vehicle.

16 Claims, 7 Drawing Sheets

(51) Int. Cl.
*G06F 3/0488* (2013.01)
*G06F 3/16* (2006.01)
*G06F 3/0481* (2013.01)
*G06F 3/0484* (2013.01)
*G06Q 30/02* (2012.01)
*B60K 37/06* (2006.01)
*B60K 35/00* (2006.01)
*G09F 21/04* (2006.01)
*G09F 27/00* (2006.01)

(52) U.S. Cl.
CPC .......... *G06F 3/0481* (2013.01); *G06F 3/0484* (2013.01); *G06F 3/04883* (2013.01); *G06F 3/167* (2013.01); *G06Q 30/0266* (2013.01); *G09F 21/048* (2013.01); *G09F 27/005* (2013.01); *B60K 2370/148* (2019.05); *B60K 2370/1438* (2019.05); *B60K 2370/151* (2019.05); *B60K 2370/152* (2019.05); *B60K 2370/165* (2019.05); *B60K 2370/169* (2019.05); *B60K 2370/186* (2019.05); *B60K 2370/48* (2019.05); *B60K 2370/52* (2019.05); *B60K 2370/55* (2019.05); *B60K 2370/566* (2019.05); *B60K 2370/573* (2019.05); *B60K 2370/58* (2019.05); *B60K 2370/586* (2019.05); *B60K 2370/589* (2019.05); *B60K 2370/5899* (2019.05); *B60K 2370/592* (2019.05); *B60K 2370/595* (2019.05); *B60K 2370/5911* (2019.05); *B60K 2370/741* (2019.05); *B60K 2370/797* (2019.05); *G09F 2027/001* (2013.01)

(56) References Cited

U.S. PATENT DOCUMENTS

| 9,412,273 | B2* | 8/2016 | Ricci | H04W 4/22 |
| 9,524,597 | B2* | 12/2016 | Ricci | G07C 9/00126 |
| 9,878,666 | B2* | 1/2018 | Brubaker | B60R 1/00 |
| 10,068,255 | B2* | 9/2018 | Dawson | G06Q 30/00 |
| 2002/0032035 | A1* | 3/2002 | Teshima | G06Q 30/02 455/456.3 |
| 2004/0036622 | A1* | 2/2004 | Dukach | G06Q 30/02 340/691.6 |
| 2006/0213100 | A1* | 9/2006 | McCann | B60R 13/00 40/591 |
| 2008/0018495 | A1* | 1/2008 | Dunning | G08G 1/0962 340/988 |
| 2008/0117032 | A1* | 5/2008 | Dillon | B60Q 1/503 340/426.1 |
| 2009/0234740 | A1* | 9/2009 | Jabbari | G06Q 30/02 705/14.62 |
| 2009/0261957 | A1* | 10/2009 | Kido | B60K 35/00 340/435 |
| 2009/0299857 | A1* | 12/2009 | Brubaker | G06Q 30/02 705/14.66 |
| 2010/0036717 | A1* | 2/2010 | Trest | G06Q 30/0207 705/14.1 |
| 2010/0082437 | A1* | 4/2010 | Tamayama | G06Q 30/02 705/14.58 |
| 2012/0089273 | A1* | 4/2012 | Seder | B60Q 1/268 701/2 |
| 2013/0099940 | A1* | 4/2013 | Protopapas | G07C 9/00087 340/904 |
| 2014/0040016 | A1* | 2/2014 | Amla | G09F 21/04 705/14.45 |
| 2014/0249913 | A1* | 9/2014 | Endo | G06Q 30/02 705/14.45 |
| 2014/0306835 | A1* | 10/2014 | Ricci | H04W 48/04 340/902 |
| 2014/0359499 | A1* | 12/2014 | Cho | G06F 8/38 715/765 |
| 2015/0032328 | A1* | 1/2015 | Healey | B60Q 1/503 701/36 |
| 2015/0058127 | A1* | 2/2015 | Abuelsaad | G06Q 30/0266 705/14.63 |
| 2015/0065343 | A1* | 3/2015 | Bindschaedler | A01N 43/10 504/100 |
| 2015/0077272 | A1* | 3/2015 | Pisz | B60K 37/06 340/905 |
| 2016/0328244 | A1* | 11/2016 | Ahmed | G06F 9/4443 |

* cited by examiner

SMART EXTERNAL DISPLAY FOR VEHICLES

RELATED APPLICATION(S)

The present application claims the benefit of and priority to a U.S. Provisional Patent Application Ser. No. 62/174,445, filed Jun. 11, 2015, which is hereby incorporated by reference in its entirety into the present application.

BACKGROUND

Cars are typically branded using a brand emblem and lettering fixed to the vehicle. Typical branding includes the brand emblem and a model of the car. The model of the car may reveal some information about the car, such as the displacement of the engine. When an individual walks through a parking lot, the individual may see a car and have questions about the car, such as what company makes the car, what model the car is, what model year the car is, whether the car has standard or optional components, etc. Finding the answers to these questions generally requires the individual to remember details about the car, so that they may look up the answers on the Internet at a later time.

SUMMARY

The present disclosure is directed to smart external displays for vehicles, substantially as shown in and/or described in connection with at least one of the figures, as set forth more completely in the claims.

DETAILED DESCRIPTION

Figure 1:
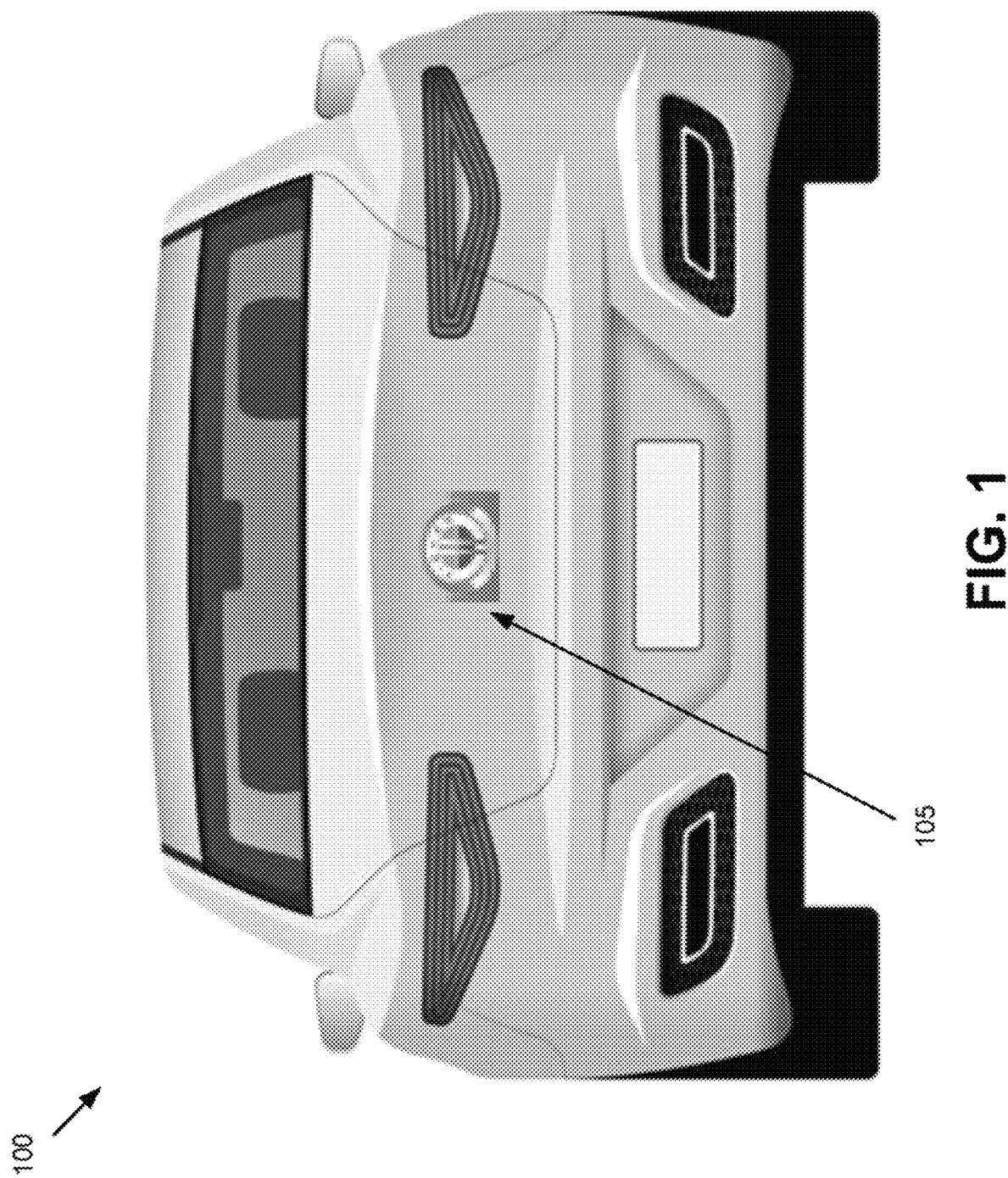
FIG. 1 shows a diagram of an exemplary vehicle including a smart external display, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary vehicle including a smart external display, according to one implementation of the present disclosure. In one implementation of the present disclosure, there is provided vehicle 100 having display screen 105, which is viewable from outside of vehicle 100, as shown in FIG. 1. As shown FIG. 1, in one mode of operation, such as the idle mode of operation, display screen 105 may display a logo or an emblem associated with vehicle 100. In the exemplary embodiment of FIG. 1, display screen 105 is placed at rear center of vehicle 100, where emblems associated with vehicles are typically displayed. In one implementation, display screen 105 may be placed at front center of vehicle 100. In other implementations, display screen 105 may be placed at any external part of vehicle 100, or behind a window of vehicle 100, such that display screen 105 is viewable from outside of vehicle 100.

Figure 2:
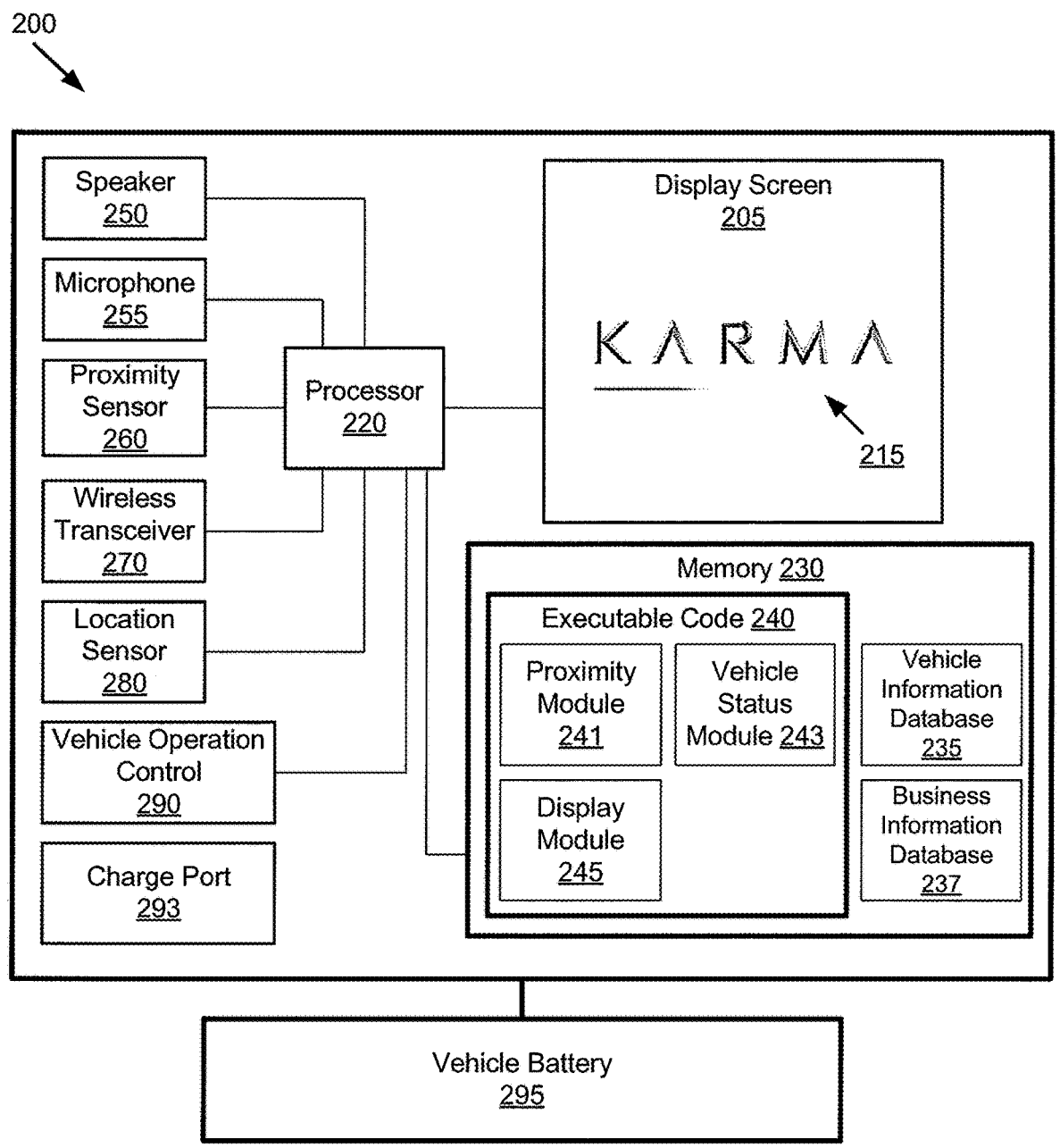
FIG. 2 shows a diagram of an exemplary smart external display system for vehicles, according to one implementation of the present disclosure.

FIG. 2 shows a diagram of an exemplary smart external display system for vehicles, according to one implementation of the present disclosure. FIG. 2 illustrates exemplary display system 200, according to one implementation of the present disclosure. As shown in FIG. 2, display system 200 includes display screen 205, which may display emblem 215 associated with vehicle 100. In one implementation display system 200 further includes processor 220 and memory 230. In other implementations, display system 200 may include one or more of speaker 250, microphone 255, proximity sensor 260, wireless transceiver 270, location sensor 280, and vehicle operation control 290. As shown in FIG. 2, in one implementation, power for display system 200 may be provided by vehicle battery 295.

In one implementation, display screen 205 may be any display capable of displaying a text, an image or a video in one or more colors. In one implementation, display screen 205 may be a touch sensitive display, such as a resistive or capacitive sensing display device. Processor 220 may be any hardware processor or central processing unit that is capable of executing a software code or algorithm, and control one or more components of display system 200. In one implementation, processor 220 may be a central processor of vehicle 100, and not a distinct and separate processor. Memory 230 is a non-transitory storage device capable of storing the software code or algorithm for execution by processor 220, and may also include text, data, images, animated images, videos, such as vehicle specification, marketing information about vehicle 100, advertisements, etc. In one implementation, the car owner may be able to alter the contents of memory 230 by deleting or adding text, data, images, animated images, videos, etc. In addition, the software code or algorithm in memory 230, and also other contents of memory 230, such as text, data, images, animated images, videos, etc., may be wirelessly updated or altered by the car manufacturer or any other authorized individual from time to time. The update may be performed automatically or downloaded by the car owner. As shown in FIG. 2, memory 230 includes vehicle information database 235 and executable code 240.

In some implementations, vehicle information database 235 may be a database stored in memory 230. Vehicle information database 235 may store information related to vehicle 100, graphics for display on display screen 205, media contents for display on display screen 205, etc. In some implementations, vehicle information database 235 may include a make of vehicle 100, a model of vehicle 100, mechanical information about vehicle 100, such as an engine displacement of an engine of vehicle 100, transmission information related to vehicle 100, fuel efficiency and/or battery efficiency of vehicle 100, etc. Vehicle information stored in vehicle information database 235 may include one or more advertisements, such as a graphic advertisement for display on display screen 205 or a video advertisement for display on display screen 205. Advertisements stored in vehicle information database 235 may include advertisements related to vehicle 100. In some implementations, vehicle information database 235 may include advertisements for businesses in the state where vehicle 100 is registered, the county where vehicle 100 is registered, the city where vehicle 100 is registered, etc. In other implementations, vehicle information database 235 may update with advertisements for businesses located near a current location of vehicle 100, business near a destination of vehicle 100, etc. Updating of vehicle information database 235 may occur wirelessly, such as using a WiFi connection or cellular connection, or vehicle information database 235 may update using a wired connection, such as when a charging cable is plugged into charge port 293 for recharging vehicle battery 295.

Business information database 237 may be a database stored in memory 230. Business information database 237 may include business information for businesses having a location in an area where vehicle 100 is located, such as a current location of vehicle 100, a location based on the registration of vehicle 100, etc. In some implementations, business information database 237 may include names of a plurality of businesses, an address or location for each business, contact information such as a phone number for each business, etc. Business information database 237 may be updateable such that businesses that are near the current location of vehicle 100 may be added. Business information database 237 may store advertising information related to one or more of the businesses stored therein. In some implementations, business information database 237 may provide advertising information for display on display screen 205. Business information database 237 may update with advertisements for businesses located near a current location of vehicle 100, business near a destination of vehicle 100, etc. Updating of business information database 237 may occur wirelessly, such as using a WiFi connection or cellular connection, or business information database 237 may update using a wired connection, such as when a charging cable is plugged into charge port 293 for recharging vehicle battery 295.

Executable code 240 may include one or more software modules stored in memory 230 for execution by processor 220. As shown in FIG. 2, executable code 240 includes proximity module 241, vehicle status module 243, and display module 245. Proximity module 241 is a software module stored in memory 230 for execution by processor 220 to detect an individual within a distance or proximity of vehicle 100. Proximity module 241 may activate display screen 205 when an individual approaches within the proximity of vehicle 100. In one implementation, proximity module 241 may use wireless transceiver 270 to transmit a proximity detection signal, such as a radio signal or other electromagnetic signal to detect a key associated with vehicle 100. The key associated with vehicle 100 may receive the proximity detection signal and transmit a response signal. Proximity module 241 may determine the proximity of the key associated with vehicle 100 based on the response signal received using wireless transceiver 270. In another implementation the proximity detection signal may be an audio signal transmitted using speaker 250, such as an audio signal that is outside of typical human hearing range, e.g., above 20 kHz. Proximity module 241 may receive a response signal received by microphone 255 and determine the proximity of an individual based on the response signal. Proximity module 241 may calculate the proximity of the individual based on the time taken to receive the response signal, and/or may determine that the individual is approaching vehicle 100 based on a Doppler shift of the response signal.

In some implementations, proximity module 241 may detect an individual as the individual approaches vehicle 100. In some implementations, proximity module 241 may detect an individual as the individual approaches vehicle 100, but before the individual is within a distance or proximity of vehicle 100 to activate display screen 205. For example, proximity module 241 may detect an individual when the individual is within about one hundred (100) feet of vehicle 100, but may not activate display screen 205 until the individual has approached to within about fifty (50) feet of vehicle 100.

Vehicle status module 243 is a software module stored in memory 230 for execution by processor 220 to retrieve vehicle status information for display on display screen 205. In some implementations, vehicle status module may update a status of various components or systems of vehicle 100, such as a battery charge and/or a charging status of vehicle battery 295. Vehicle status module 243 may transmit vehicle status information, such as the battery charge level, the charging status of vehicle 100, the location of vehicle 100, etc., to display module 245.

Display module 245 is a software module stored in memory 230 for execution by processor 220 to display information on display screen 205. In some implementations, display module 245 may display vehicle information from vehicle information database 235 on display screen 205. For example, display module 245 may display vehicle information including the make and model of vehicle 100, the production year of vehicle 100, various standard and/or upgrade features included in vehicle 100, etc. In some implementations, display module 245 may display business information stored in business information database 237 on display screen 205. For example, display module 245 may display a logo of business, an advertisement for a business, a location of a business, etc., on display screen 205. In other implementations, display module 245 may display a vehicle status received from vehicle status module 243 on display screen 205. In some implementations, display module 254 may receive an input signal from one or more vehicle components and/or systems such as battery 295. The input signal may include information related to the component, such as the current charge of battery 295, the charging status of battery 295, e.g., whether battery 295 is currently charging or not. Display module 245 may display the current charge level of battery 295 and/or the current charge status of battery 295 on display screen 205.

Speaker 250 may be any audio speaker that converts electrical signals provided by processor 220 to sound, which is audible by people outside of vehicle 100. In one implementation, the volume level of speaker 250 may be programmable by the owner of vehicle 100 through a user interface. In one implementation, speaker 250 may also emit audio sounds that are not audible by human ears, e.g. above 20 kHz, for communicating information, which is encoded in audio signals, to other computing devices using techniques known in the art.

Microphone 255 may be any audio receiver that converts sound into electrical signals, which are provided to processor 220, and which may be provided to an analog-to-digital (A/D) converter (not shown) for generating a digitized audio. In one implementation, microphone 255 may be able to receive audible and inaudible sound and convert the same to electrical signals. In one implementation, digitized audio generated from audible sounds may be utilized by processor 220 to execute a speech recognition code in memory 230 for voice commands recognition. In one implementation, digitized audio generated from inaudible sounds may be utilized by processor 220 to receive and decode information encoded into audio signals by other computing devices, e.g. data communicated by mobile device to display system 200.

Proximity sensor 260 is any sensor that is able to detect the presence of nearby objects, such as people, without any physical contact with display screen 205. In one implementation, under the control of processor 220, proximity sensor 260 emits an electromagnetic field or a beam of electromagnetic radiation, such as infrared, and determines changes in the electromagnetic field or the return signal. In one implementation, processor 220 is able to use proximity sensor 260 to determine an approximate distance of an individual from vehicle 100. In other implementations, processor 220 is able to use proximity sensor 260 to determine whether an individual is within a predetermined distance of vehicle 100.

Wireless transceiver 270 may be a wireless transmitter and receiver compatible with RFID, Bluetooth, WiFi and any other wireless communication protocols. In one implementation, processor 220 may execute a wireless communication code stored in memory 230 for receiving and transmitting wireless data using wireless transceiver 270. For example, processor 220 may use wireless transceiver 270 to transmit text, data and video to a wireless tablet or wireless telephone, which is within a predetermined distance from vehicle 100. Also, processor 220 may use wireless transceiver 270 to receive information and commands from such a wireless tablet or wireless telephone.

Location sensor 280 is able to determine the current location of vehicle 100 using location information, such as global positioning system (GPS) information or cell tower location information. In one implementation, location sensor 280 may receive the location information from a navigation system in vehicle 100 or from a mobile device of the driver, such as a mobile phone.

Vehicle operation control 290 may be utilized by processor 220 to control various operations of vehicle 100 and/or receive information from various components of vehicle 100. In one implementation, vehicle operation control 290 may provide an interface between processor 220 and main control system of vehicle 100 to control various operations of vehicle 100 and/or receive information from various components of vehicle 100, e.g. turning on/off vehicle 100, rolling the windows up/down, obtaining charge status of vehicle battery 295, locking/unlocking the doors, etc.

In one implementation, display screen 205 may be activated by processor 220 in response to detecting an object near vehicle 100 by proximity sensor 260. In one implementation, display screen 205 may be activated by processor 220 in response to detecting signals emitted from a smart key of the driver. In other implementations, display screen 205 may be activated by processor 220 in response to detecting a touch, multi-touch or a series known touches or sequence of touches on display screen 205, or by fingerprint detection. In yet other implementations, display screen 205 may be activated by processor 220 in response to a location provided by location sensor 280, or display screen 205 may be activated by processor 220 at a pre-determined time or pre-determined time intervals. In one implementation, display screen 205 may be activated by processor 220 in response to detecting a voice command by a speech recognizer using microphone 255. In one implementation, display screen 205 may be activated by processor 220 in response to detecting that vehicle battery 295 being charged. In addition, display screen 205 may display an indication of the charging status of vehicle battery 295, and/or an estimated number of miles that vehicle 100 may be driven based on the charging status.

In one implementation, if the individual detected near the car, using voice, or proximity sensing, etc. is not an owner of the car, e.g. the individual is not in possession of the smart key, voice is not recognized to be of the owner's, fingerprint does not match, etc., display screen 205 may display general information about vehicle 100, specification information about vehicle 100, an advertisement, and where to obtain more information about vehicle 100. However, if the individual is confirmed to be the owner of vehicle 100, display screen 205 may be used to control various operations of vehicle 100, as discussed above, and may provide operational information about the car, such as status of vehicle battery 295.

In one implementation, display screen 205 may include a cover (not shown), which automatically closes when vehicle 100 is turned on or when vehicle 100 starts moving, and automatically opens when vehicle is parked or vehicle 100 is turned off. The cover may be designed to protect display screen 205 from road hazards. In one implementation, the cover may display a logo or emblem 215 of vehicle 100 when the cover is closed. In another implementation, the cover may be transparent, such that display screen 205 may be observable through the cover, and display screen 205 may display a logo or emblem 215 of vehicle 100 or any text, images, animated images, videos, etc.

In one implementation, wireless transceiver 270 may communicate information, using RFID, Bluetooth, WiFi or any other wireless technology, to a mobile device of an individual, such as a mobile phone, mobile tablet or a mobile notebook. The information may provide an identification code or a URL that can be used by a software application running on the mobile device to locate on a remote server and present information about vehicle 100 obtained from the remote server, such as providing information about the specification of vehicle 100, price, options, etc. Information communicated by wireless transceiver 270 may include information about the specification of vehicle 100, price, options, etc., such that obtaining information from the remote server may not be necessary.

In one implementation, when vehicle 100 is parked, display screen 205 may display advertisements, which may be location-based advertisements according to the location detected by location sensor 280. For example, if vehicle 100's location is found to be close to certain points of interest, such as shops, restaurants, grocery stores, etc., advertisements and specials related to those points of interest may be displayed on display screen 205. In one implementation, the car owner and/or the car manufacturer may receive advertisement fees from the advertisers for playing the advertisements, based on frequency, location, people traffic at the location, etc. As discussed above, the contents of memory 230 may be updated by the car owner or the car manufacturer or any authorized individual in order to change the advertisements. As such, the advertisements may be downloaded to memory 230 based on the current location of the car.

Figure 3:
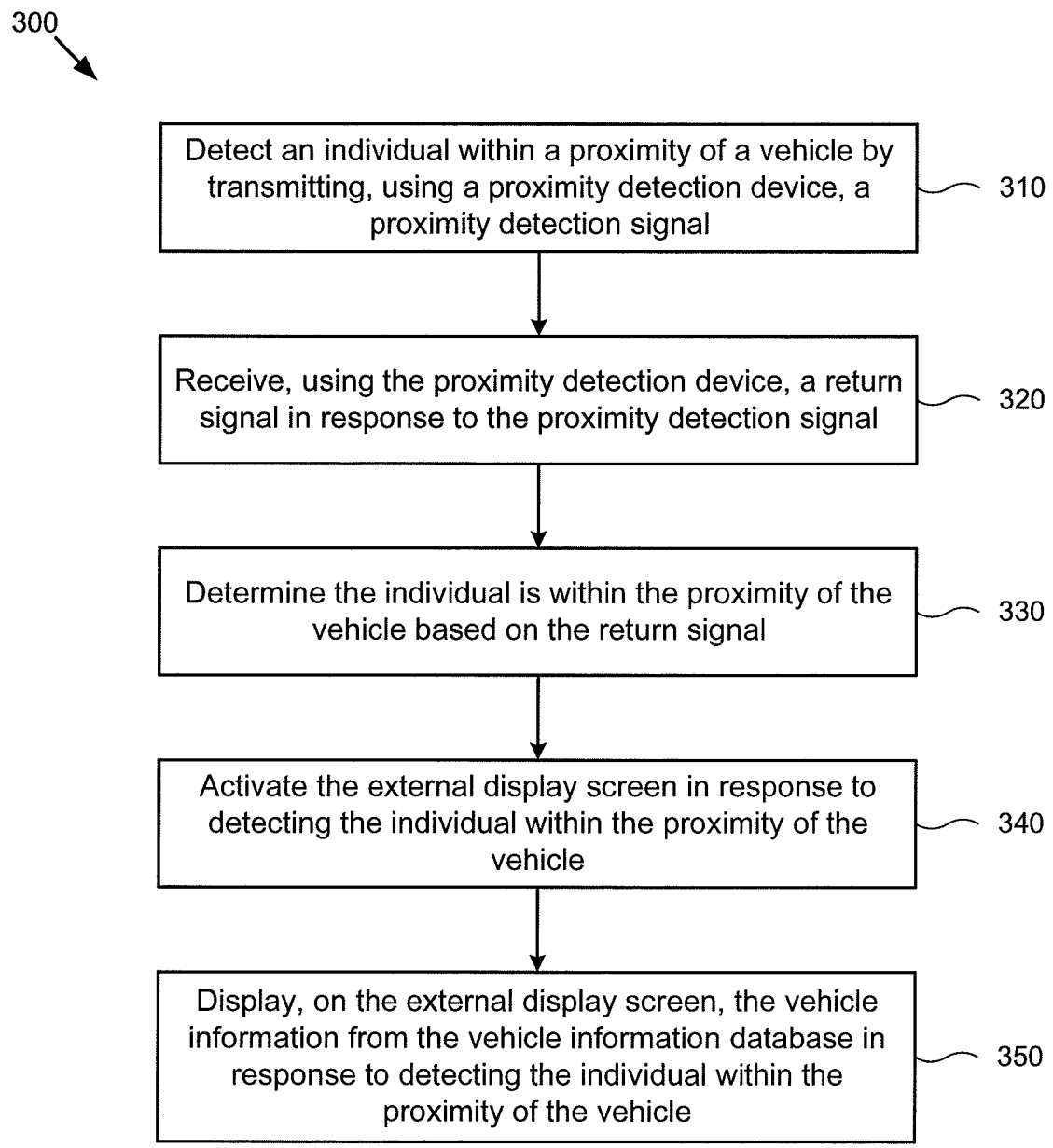
FIG. 3 shows a flowchart illustrating an exemplary method of displaying vehicle information on the smart external display, according to one implementation of the present disclosure.

FIG. 3 shows a flowchart illustrating an exemplary method of displaying vehicle information on the smart external display, according to one implementation of the present disclosure. Method 300 begins at 310, where executable code 240 detects an individual within a distance or proximity of a vehicle by transmitting, using proximity sensor 260, a proximity detection signal. The proximity detection signal may be an electromagnetic signal, such as an infrared signal, for detecting one or more individuals within the proximity of vehicle 100. In other implementations, the proximity detection signal may be an audio signal, such as a non-auditory signal having a frequency that is not within the audible range of human hearing, such as a signal with a frequency above twenty kilohertz (20 kHz). Method 300 continues at 320, where executable code 240 receives, using proximity sensor 260, a return signal in response to the proximity detection signal. In some implementations, proximity sensor 260 may receive the proximity detection signal from wireless transceiver 270 in response to an electromagnetic proximity detection signal or from microphone 255 when the proximity detection signal is an audio signal.

At 330, where executable code 240 determines the individual is within the proximity of vehicle 100 based on the return signal. Proximity module 241 may determine an approximate distance between an individual and vehicle 100 be detecting a change in the proximity detection signal. For example, proximity module 241 may detect a change in an electromagnetic field, receive a return signal, such as a reflected IR signal or reflected audio signal, etc. Based on the transmitted proximity detection signal and the response signal, or the detected change in the transmitted filed, proximity module 241 may determine an approximate distance between the individual and vehicle 100, such as by calculating the time to receive the return signal. Proximity module 241 may determine when the individual is within a certain distance of vehicle 100, such as within 50 feet, 20 feet, etc.

Method 300 continues at 340, where executable code 240 activates display screen 205 in response to detecting the individual within the proximity of vehicle 100. At 350, executable code 240 displays, on display screen 205, the vehicle information from vehicle information database 235 in response to detecting the individual within the proximity of vehicle 100. In some implementations, the vehicle information may include emblem 215, a branding video, a make of vehicle 100, a model of vehicle 100, an advertisement, a battery charge status of battery 295, etc.

Figure 4:
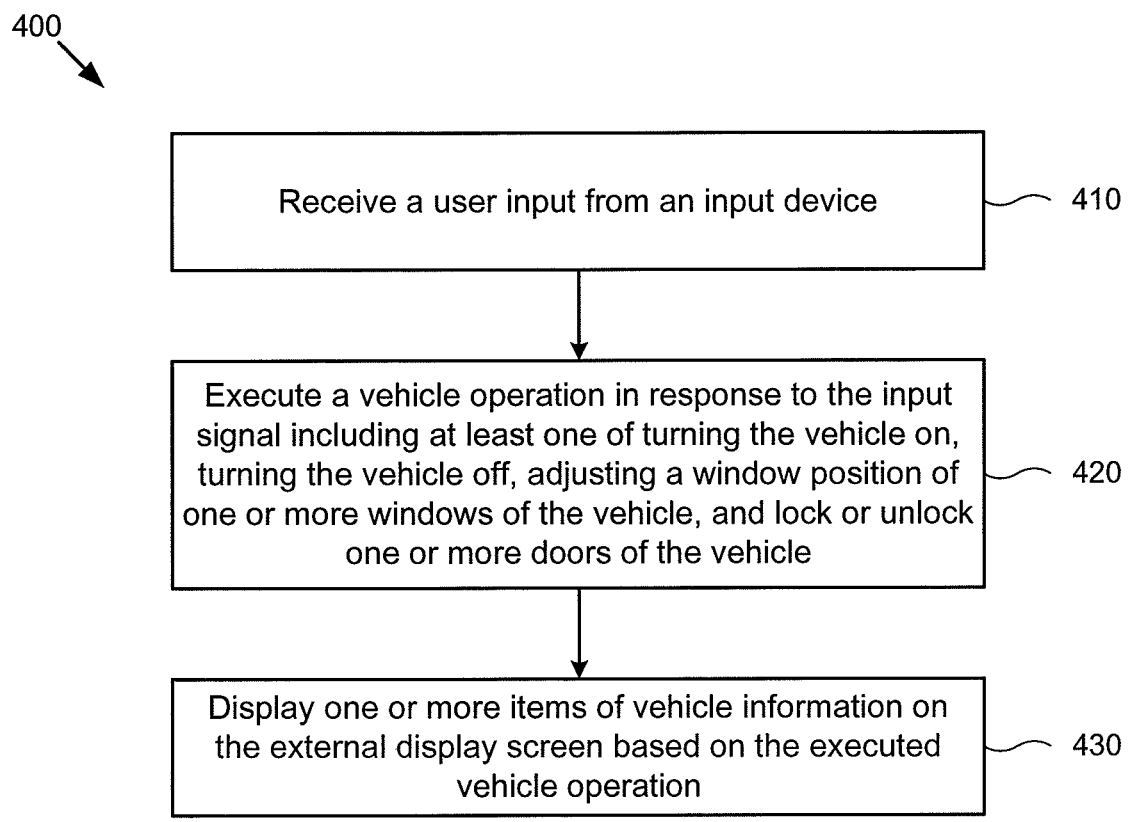
FIG. 4 shows a flowchart illustrating another exemplary method of displaying vehicle information on the smart external display, according to one implementation of the present disclosure.

FIG. 4 shows a flowchart illustrating another exemplary method of displaying vehicle information on display screen 205, according to one implementation of the present disclosure. Method 400 begins at 410, where executable code 240 receives a user input from an input device. In some implementations, the user device may be a key fob associated with vehicle 100, a mobile device such as a mobile phone running an application to provide user input for vehicle 100, etc. The user input may indicate a vehicle operation. Method 400 continues at 420, where executable code 240 executes the vehicle operation in response to the input signal. The vehicle operation may include at least one of turning vehicle 100 on, such as by starting a gas engine or electric motor of vehicle 100, turning vehicle 100 off, such as by stopping the gas engine or electric motor of vehicle 100, adjusting a window position of one or more windows of vehicle 100, locking or unlocking one or more doors of vehicle 100, etc.

At 430, executable code 240 displays one or more items of vehicle information on display screen 205 in response to the input signal. Vehicle information may include a message, such as a greeting or farewell message. For example, when the individual returns to vehicle 100 and activates the key fob associated with vehicle 100 to unlock vehicle 100, display module 245 may display a message saying "Hello" or "Welcome back." In some implementations, the message may be personalized to the individual based on the key fob associated with the vehicle, such as by including the name of the individual in the greeting or farewell message.

Figure 5:
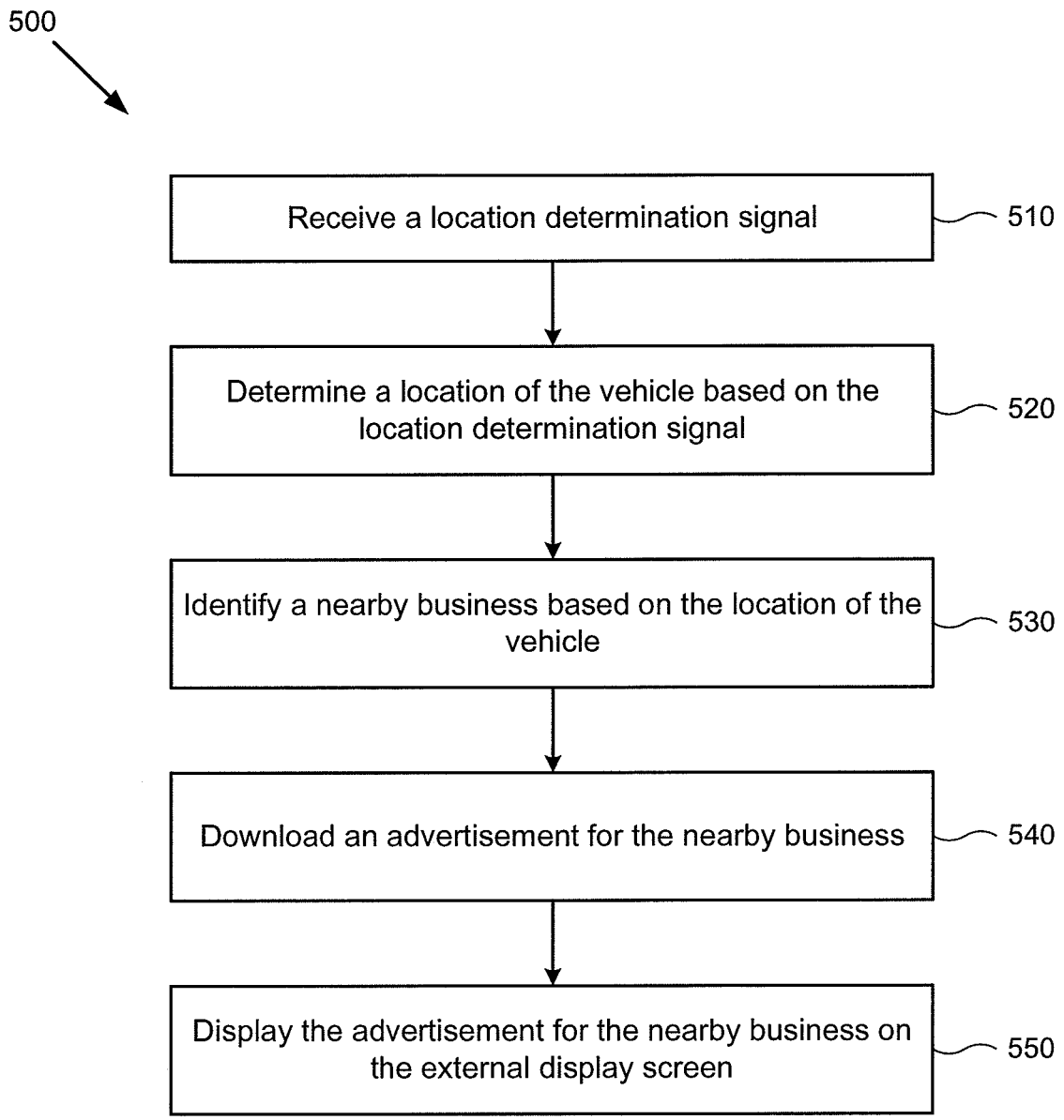
FIG. 5 shows a flowchart illustrating another exemplary method of displaying vehicle information on the smart external display, according to one implementation of the present disclosure.

FIG. 5 shows a flowchart illustrating another exemplary method of displaying vehicle information on display screen 205, according to one implementation of the present disclosure. Method 500 begins at 510, where executable code 240 receives a location information signal. In some implementations, the location information signal may be a signal from one or more cellular towers, a GPS signal, etc. At 520, executable code 240 determines a location of vehicle 100 based on the location information signal.

At 530, executable code 240 identifies a nearby business based on the location of vehicle 100. In some implementations, memory 230 may include a business listing including the name, address, location, etc. of a plurality of businesses. Executable code 240 may compare the current location of vehicle 100 with the business listing stored in memory 230 and identify one more businesses that are located near the determined location of vehicle 100. A business that is near the determined location of vehicle 100 may be located within walking distance of vehicle 100, such as within about one quarter mile of the determined location of vehicle 100, one half mile of the determined location of vehicle 100, etc.

At 540, executable code 240 downloads an advertisement for the nearby business. In some implementations, executable code 240 may download the advertisement from the Internet over a wireless network, such as a WiFi network or a cellular network. In one implementation, businesses may sign up for video advertising and vehicle 100 may download a plurality of advertisements for businesses in the city where vehicle 100 is typically used, such that when the location of vehicle 100 is determined, advertisements for all eligible business may already be stored in memory 230. Advertisements for eligible businesses stored in memory 230 may enable executable code 240 to display advertisements for one or more nearby businesses even when a wireless Internet connection is not available. Method 500 continues at 540, where executable code 240 displays the advertisement for the nearby business on display screen 205.

Figure 6:
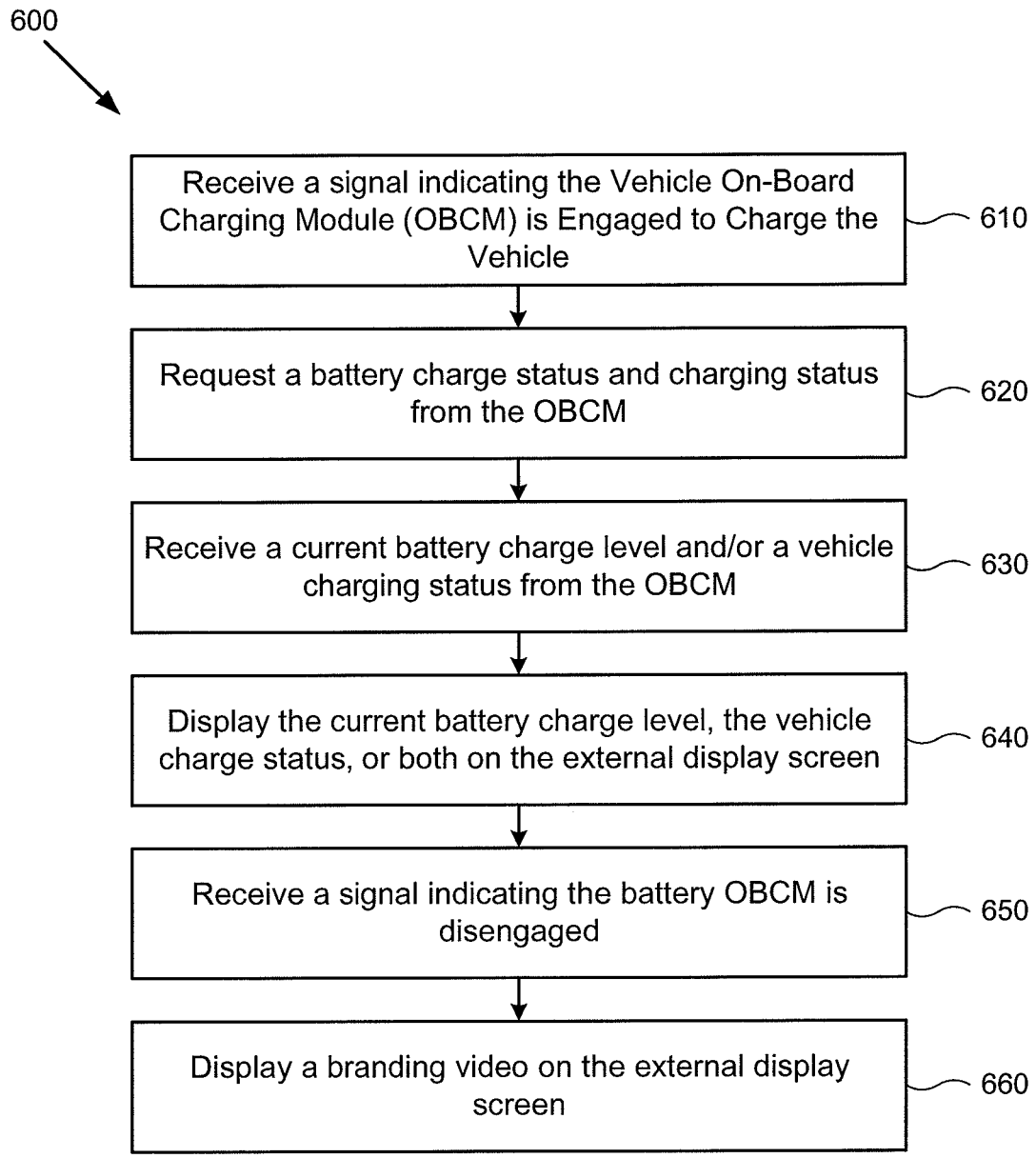
FIG. 6 shows a flowchart illustrating another exemplary method of displaying vehicle information on the smart external display, according to one implementation of the present disclosure.

FIG. 6 shows a flowchart illustrating another exemplary method of displaying vehicle information on display screen 205, according to one implementation of the present disclosure. Method 600 begins at 610, where executable code 240 receives a signal indicating the Vehicle On-Board Charging Module (OBCM) is engaged to charge vehicle 100. In some implementations, the OBCM may be engaged when an individual plugs a vehicle charging cable into a charge port 293 of vehicle 100 to charge battery 295. In other implementations, the OBCM may be engaged when vehicle 100 is parked in a wireless charging station and the wireless charging system is engaged to charge battery 295. Method 600 continues at 620, where executable code 240 requests a battery charge status and/or charging status from the OBCM.

At 630, executable code 240 receives a current battery charge level and/or a vehicle charging status from the OBCM. In some implementations, the current battery charge level may include a percentage of the total possible charge stored in battery 295, an amount time remaining to achieve a full charge of battery 295, a total energy currently stored in battery 295, a remaining amount of energy required to reach a full charge of battery 295, etc. The charging status may indicate that vehicle 100 is currently charging, that battery 295 has reached capacity and the OBCM remains engaged, that the OBCM is no longer engaged, that vehicle 100 is not currently charging, etc.

At 640, executable code 240 displays the current battery charge level, vehicle 100 charge status, or both the current battery charge level and vehicle 100 charge status on display screen 205. Display module 245 may display the current battery charge level of battery 295 as a numerical representation of the current charge, such as displaying seventy five percent (75%) when the battery is seventy five percent charges, or display module may display the current battery charge level of battery 295 as a graphic showing an image of an outline of a battery with the current charge level represented by how full the outline is representing the current charge level of battery 295. The charge status of vehicle 100 may be indicated by displaying the word "Charging" when the OBCM is engaged and battery 295 is charging, by displaying an icon or graphic indicator when the OBCM is engaged and battery 295 is charging, such as an lightning bolt indicating electricity, etc.

At 650, executable code 240 receives a signal indicating the OBCM is disengaged. In some implementations, the OBCM may disengage when an individual disconnects the charging cable from the charge port 293 of vehicle 100, when the individual moves vehicle 100 from the wireless charging station, etc. In one implementation, the OBCM may disengage when battery 295 has a full charge. Method 600 continues at 660, where executable code 240 displays a branding video on display screen 205. The branding display video may include emblem 215, a silent video advertisement, a video advertisement with audio, etc.

Figure 7:
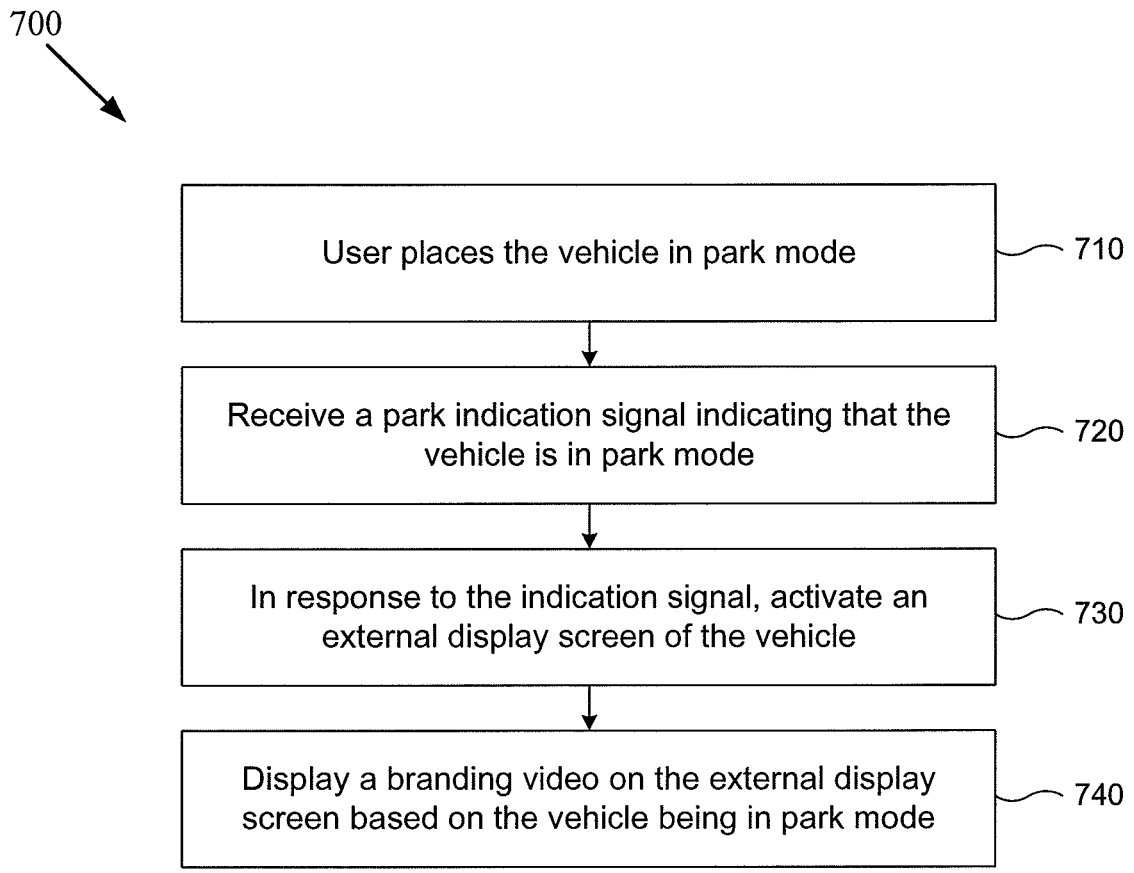
FIG. 7 shows a flowchart illustrating another exemplary method of displaying vehicle information on the smart external display, according to one implementation of the present disclosure.

FIG. 7 shows a flowchart illustrating another exemplary method of displaying vehicle information on display screen 205, according to one implementation of the present disclosure. Method 700 begins at 710, where an individual holding the key fob associated with vehicle 100 places vehicle 100 in park mode. In some implementations, the placing vehicle 100 in park mode may include turning off the ignition of vehicle 100, such as by turning the key to an off position or pressing the push-button power of vehicle 100 to deactivate vehicle 100, and/or placing the transmission or drive control of vehicle 100 in park position.

At 720, executable code 240 may receive a signal indicating that vehicle 100 is in park mode. At 730, executable code 240, in response to the signal indicating vehicle 100 is in park mode, executable code 240 may activate display screen 205. Method 700 continues at 740, where executable code 240 displays a branding video on display screen 205. In some implementations, display module 245 may display a vehicle branding video, a make and model of vehicle 100, or other vehicle information related to vehicle 100 on display screen 205. The branding video may include a single image, such as emblem 215, or the branding video may include a plurality of images. In some implementations, the plurality of images may be displayed in sequence to portray a video advertisement related to vehicle 100.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A vehicle comprising:
a body having an exterior;
an external display screen located on the exterior of the body and only visible from the exterior of the vehicle;
a non-transitory memory storing an executable code and an information database; and
a hardware processor executing the executable code to:
detect that the vehicle is in park mode;
in response to detecting that the vehicle is in the park mode, activate the external display screen and display, on the external display screen, information stored in the memory;
a proximity sensor;
wherein in response to detecting that the vehicle is moving, a cover automatically moves into a position that covers and protects the external display screen;
wherein activating the external display further requires detection of an individual within the proximity of the vehicle, the hardware processor further executes the executable code to:
transmit, using the proximity sensor, a proximity detection signal;
receive, using the proximity sensor, a return signal in response to the proximity detection signal;
determine the individual is within the proximity of the vehicle based on the return signal
receive a location information signal;
determine a location of the vehicle based on the location information signal;
identify a nearby business based on the location of the vehicle; and
display an advertisement for the nearby business on the external display screen.

2. The vehicle of claim 1, wherein the hardware processor further executes the executable code to:
receive a user input from an input device; and
display the marketing information for the vehicle on the external display screen based on the user input;
wherein the user input is one of a touch-screen input and a voice input.

3. The vehicle of claim 1, wherein the hardware processor further executes the executable code to:
receive a user input from an input device;
display the vehicle information on the external display screen based on the user input; and
execute a vehicle operation in response to the user input including at least one of turning the vehicle on, turning the vehicle off, adjusting a window position of one or more windows of the vehicle, and lock or unlock one or more doors of the vehicle.

4. The vehicle of claim 1, wherein displaying the information includes displaying at least one of a graphic, a video, and a status indicator on the external display screen.

5. The vehicle of claim 1, wherein the location information signal is one of a global position system (GPS) signal and a cellular signal.

6. The vehicle of claim 1, wherein the vehicle information includes a battery charge status of a battery of the vehicle.

7. The vehicle of claim 1, wherein the hardware processor further executes the executable code to:
communicate the marketing information to a mobile device in response to detecting the individual within the proximity of the vehicle.

8. A vehicle comprising:
a body having an exterior;
an external display screen located on the exterior of the body and only visible from the exterior of the vehicle;
a non-transitory memory storing an executable code and an information database; and
a hardware processor executing the executable code to:
detect that the vehicle is in a park mode;
in response to detecting that the vehicle is in the park mode, activate the external display screen;
receive a location information signal;
determine a location of the vehicle based on the location information signal;
identify a nearby business by comparing the location of the vehicle with a business list stored in the memory;
display, on the external display screen, an advertisement for the nearby business, in response to detecting that the vehicle is in the park mode;
wherein in response to detecting that the vehicle is moving, a cover automatically moves into a position that covers and protects the external display screen;
a proximity sensor, wherein activating the external display further requires detection of an individual within the proximity of the vehicle, the hardware processor further executes the executable code to:
transmit, using the proximity sensor, a proximity detection signal;
receive, using the proximity sensor, a return signal in response to the proximity detection signal; and
determine the individual is within the proximity of the vehicle based on the return signal.

9. The vehicle of claim 8, wherein the hardware processor further executes the executable code to:
receive a user input from an input device; and
display vehicle information on the external display screen based on the user input;
wherein the user input is one of a touch-screen input and a voice input.

10. The vehicle of claim 8, wherein the hardware processor further executes the executable code to:
receive a user input from an input device;
display vehicle information on the external display screen based on the user input; and
execute a vehicle Operation in response to the user input including at least one of turning the vehicle on, turning the vehicle off, adjusting a window position of one or more windows of the vehicle, and lock or unlock one or more doors of the vehicle.

11. The vehicle of claim 8, wherein displaying the advertisement includes displaying at least one of a graphic and a video on the external display screen.

12. The vehicle of claim 8, wherein the location information signal is one of a global position system (GPS) signal and a cellular signal.

13. The vehicle of claim 8, wherein the external display screen is located at a rear center or a front center of the vehicle, and wherein in an idle mode of operation a logo of the vehicle is displayed on the external display screen.

14. A vehicle comprising:
a body having an exterior;
an external display screen located on the exterior of the body and only visible from the exterior of the vehicle;
a non-transitory memory storing an executable code and an; and
a hardware processor executing the executable code to:
detect that the vehicle is in a park mode;
in response to detecting that the vehicle is in the park mode, activate the external display screen;
display, on the external display screen, the vehicle information from the vehicle information database stored in the memory, in response to detecting that the vehicle is in the park mode, wherein the vehicle information includes a battery charge status of a battery of the vehicle;
wherein in response to detecting that the vehicle is moving, a cover automatically moves into a position that covers and protects the external display screen;
wherein activating the external display further requires detection of an individual within the proximity of the vehicle, the hardware processor further executes the executable code to:
transmit, using a proximity sensor, a proximity detection signal;
receive, using the proximity sensor, a return signal in response to the proximity detection signal;
determine the individual is within the proximity of the vehicle based on the return signal; and
wherein the hardware processor further executes the executable code to:
receive a location information signal;
determine a location of the vehicle based on the location information signal;
identify a nearby business based on the location of the vehicle;
display an advertisement for the nearby business on the external display screen.

15. The vehicle of claim 14, wherein the hardware processor executes the executable code to display, on the external display screen, a branding emblem, in response to an on-board charging module of the vehicle disengaging.

16. The vehicle of claim 14, wherein the detecting the individual within the proximity of the vehicle is based on detecting a key within the proximity of the vehicle.

* * * * *